United States Patent
An et al.

(10) Patent No.: US 9,878,931 B2
(45) Date of Patent: Jan. 30, 2018

(54) DEVICE FOR ARTIFICIAL WETLAND SEWAGE TREATMENT AND METHOD FOR TREATING SEWAGE THEREOF

(71) Applicant: NANJING UNIVERSITY ECOLOGICAL RESEARCH INSTITUTE OF CHANGSHU, Suzhou, Jiangsu (CN)

(72) Inventors: Shuqing An, Jiangsu (CN); Delin Xu, Jiangsu (CN); Lijun Ren, Jiangsu (CN); Tangwu Yang, Jiangsu (CN)

(73) Assignee: NANJING UNIVERSITY ECOLOGICAL RESEARCH INSTITUTE OF CHANGSHU, Suzhou (CN)

( * ) Notice: Subject to any disclaimer, the term of this patent is extended or adjusted under 35 U.S.C. 154(b) by 27 days.

(21) Appl. No.: 15/121,053

(22) PCT Filed: Dec. 5, 2014

(86) PCT No.: PCT/CN2014/093083
§ 371 (c)(1),
(2) Date: Aug. 24, 2016

(87) PCT Pub. No.: WO2015/139484
PCT Pub. Date: Sep. 24, 2015

(65) Prior Publication Data
US 2016/0376180 A1    Dec. 29, 2016

(30) Foreign Application Priority Data
Mar. 21, 2014    (CN) .......................... 2014 1 0107296

(51) Int. Cl.
*C02F 3/32* (2006.01)
*C02F 3/04* (2006.01)
(Continued)

(52) U.S. Cl.
CPC .............. *C02F 3/327* (2013.01); *C02F 1/008* (2013.01); *C02F 3/046* (2013.01);
(Continued)

(58) Field of Classification Search
CPC .......... C02F 3/327; C02F 3/046; C02F 1/008; C02F 2203/006; C02F 2103/005; C02F 2209/03; C02F 2209/44; Y02W 10/15
(Continued)

(56) References Cited

U.S. PATENT DOCUMENTS 6,447,681 B1 *    9/2002    Carlberg ................. A01K 63/04
119/227
2014/0124420 A1 *    5/2014    Kim .......................... C02F 3/30
210/96.1
(Continued)

FOREIGN PATENT DOCUMENTS

CN    1163427 C    8/2004
CN    101157496 A    4/2008
(Continued)

OTHER PUBLICATIONS

1st Office Action of counterpart Chinese Patent Application No. 201410107296.7 dated Dec. 3, 2014.
(Continued)

*Primary Examiner* — Fred Prince

(57) ABSTRACT

A device for artificial wetland sewage treatment, which comprises a vertical flow artificial wetland bed body with an openmouthed upper portion, a vertical flow sewage treatment artificial wetland arranged on the vertical flow artificial wetland bed body, a diversion canal formed at one end of the vertical flow artificial wetland bed body, a draining ditch formed at the other end of the vertical flow artificial wetland bed body, a baffle wall dividing into a first wetland unit and a second wetland unit, an upper water conduit with an upper
(Continued)

water conduit inlet valve at one end. It ensures the service life of the vertical flow sewage treatment artificial wetland and avoids pipe blockage; has the lasting purification treatment capacity; has a simple structure and can achieve the low cost of construction and convenient operation management; and has a long-term stable use effect.

12 Claims, 3 Drawing Sheets

(51) Int. Cl.
*C02F 1/00* (2006.01)
*C02F 103/00* (2006.01)

(52) U.S. Cl.
CPC .. *C02F 2103/005* (2013.01); *C02F 2203/006* (2013.01); *C02F 2209/03* (2013.01); *C02F 2209/44* (2013.01); *Y02W 10/15* (2015.05)

(58) Field of Classification Search
USPC ..... 210/602, 615, 616, 617, 170.01, 170.03, 210/290
See application file for complete search history.

(56) References Cited

U.S. PATENT DOCUMENTS

| 2015/0315050 A1* | 11/2015 | Chai | C02F 3/302 |
| | | | 210/137 |
| 2016/0176733 A1* | 6/2016 | Calka | C02F 3/327 |
| | | | 210/93 |

FOREIGN PATENT DOCUMENTS

| CN | 101671096 A | 3/2010 |
| CN | 101693588 A | 4/2010 |
| CN | 103274529 A | 9/2013 |
| CN | 203307122 U | 11/2013 |

OTHER PUBLICATIONS

International search report of PCT Patent Application No. PCT/CN2014/093083 dated Mar. 11, 2015.

* cited by examiner

DEVICE FOR ARTIFICIAL WETLAND SEWAGE TREATMENT AND METHOD FOR TREATING SEWAGE THEREOF

TECHNICAL FIELD

The present invention refers to the field of sewage treatment technology in environmental engineering, and more particularly to a device for artificial wetland sewage treatment, and the method for treating sewage thereof.

BACKGROUND ART

At present, the urban sewage treating plants in our country mainly adopt the conventional secondary activated sludge treatment to treating sewage. With the increase of sewage, the treatment capacity should be reformed to increase too. While if this reform is based on the conventional process i.e. the above secondary activated sludge treatment, it will lead to the high investment cost, high energy consumption, high operation and management requirements and easy secondary pollution, which does not meet the requirements of sustainable development. If the conventional biological aeration tank is adopted, the organic matter in sewage can be removed effectively, but the removal ability of nitrogen and phosphorus was low; if the membrane bioreactor i.e. membrane separation technology is adopted, the quality of output water is very high, but the investment and operating costs are expensive, which greatly restricts the wide application of this technology; if other chemical and physical treatment technology is adopted, there are problems such as high investment and operating costs, unstable quality of output water and secondary pollution.

Artificial wetland technology is a sewage treatment technology since 1970s, because of the advantages such low construction investment and operation management cost, low energy consumption, long operation period and stable operation, it has been gradually applied to the domestic sewage treatment in small and medium-sized cities and rural areas.

The technical information about artificial wetland technology can be found in the published Chinese patent documents, typically as the "a sewage treatment and device thereof" recommended by granted patent CN1163427C, which includes the following steps: firstly, making sewage pass through settling pond to removing hard grain and suspension; then feeding the sewage into flowing bed in which the gravels are filled and the aquatic plant and hydrophytes are planted so as to further reduce suspension in sewage and reduce COD of sewage; then feeding the sewage into downward artificial wetland bed (downward artificial wetland in the patent), and finally into upward artificial wetland bed (upward artificial wetland in the patent). Compared with the conventional secondary activated sludge treatment, this technology can achieve the technical effect recorded in the description, page 2, line 21 to line 27. But there are some disadvantages in this patent: first is the water in flowing bed is fed into downward artificial wetland bed with a horizontal flow rather than a vertical flow, so the processing efficiency is limited; second is denitrification reaction is before nitration reaction, which is bad for denitrification reaction; third is there are a lot of links from the sewage feeding into sedimentation tank to upward artificial wetland bed, and each link is not an organic whole, so the sewage treating procedure is very long. Another solution provided by CN103274529A is "a device and method for prolonging service life of integrated vertical-flow constructed wetland", in which sewage feed into artificial wetland bed (artificial wetland unit) with vertical flow. Compared with the horizontal flow in the above patent CN1163427C, sewage treatment efficiency improved, and objectively achieved the technical effect concluded in the description, paragraph 13. But because the wetland unit body is divided into two wetland units by the partition wall, and the recycling treatment of sewage is achieved through two independent sets of water distribution system and water collecting system, there are disadvantages such as complex structure, high cost and complicated operation.

Based on the above mentioned technologies, the applicant has made a long lasting and beneficial exploration and repeated experiments, and finally formed the following technical solutions to be introduced.

SUMMARY

The primary task of the present invention is to provide an artificial wetland sewage treatment device, which will help to perform ecological treatment of urban domestic sewage and industrial wastewater with low concentration, and will help to satisfy the requirement for periodical change of the flow regime to promote the accumulation of pollutants decomposition and transformation and avoid clogging to prolong the service life of the system, and will help to improve the purification capacity of sewage and the regeneration and utilization of surface layer, and will help to simplify structure to reduce the cost of facility investment and convenient operation and maintenance.

The another task of the present invention is to provide a method of the artificial wetland sewage treatment device, which can ensure the periodic change of the flow pattern to reflect the self-flushing effect of the artificial wetland.

The primary task of the present invention is accomplished as below. A device for artificial wetland sewage treatment, comprises a vertical flow artificial wetland bed with an openmouthed upper portion and a closed bottom and around, a vertical flow sewage treatment artificial wetland arranged on the vertical flow artificial wetland bed; a diversion canal formed at one end of the vertical flow artificial wetland bed body and in the center position in the width direction of the end, which leads sewage to be treated into the vertical flow sewage treatment artificial wetland; a draining ditch formed at the other end of the vertical flow artificial wetland bed body and in the center position in the width direction of the end, which leads out water treated in the vertical flow sewage treatment artificial wetland; a baffle wall formed in the center position in the length direction of vertical flow artificial wetland bed body and dividing said vertical flow sewage treatment artificial wetland into a first wetland unit and a second wetland unit, a box culvert formed in the center position in the length direction of the baffle wall and corresponding to the area between said diversion canal and said draining ditch; an upper water conduit arranged in the vertical flow sewage treatment artificial wetland with a horizontal state and at the upper part of the vertical flow sewage treatment artificial wetland, one end of upper water conduit extends into said diversion canal and an upper water conduit inlet valve is arranged, the other end extends into said draining ditch and an upper water conduit outlet valve is arranged, the center section of the upper water conduit passes through said box culvert and an upper water conduit water control valve is arranged at the position corresponding to the box culvert; an upper water conduit branch pipe is arranged with interval state in the length direction of the upper water conduit, which forms a cross-shape relationship with upper water conduit; a lower water conduit arranged in the vertical flow sewage treatment artificial wetland with a horizontal state and at the lower part of the vertical flow sewage treatment artificial wetland, one end of lower water conduit extends into said diversion canal and an lower water conduit inlet valve is arranged, the other end extends into said draining ditch and an lower water conduit outlet valve is arranged, the center section of the lower water conduit pass through said box culvert and an lower water conduit water control valve is arranged at the position corresponding to the box culvert; an lower water conduit branch pipe is arranged with interval state in the length direction of the lower water conduit, which forms a cross-shape relationship with lower water conduit.

In one embodiment of the present invention, said sewage is urban domestic sewage or industrial sewage with low concentration, said low concentration of industrial sewage is the sewage with COD<350 mg/L, NH3-N<30 mg/L, SS<200 mg/L, TN<35 mg/L and/or TP<5 mg/L.

In one embodiment of the present invention, said vertical flow artificial wetland bed body is made of reinforced concrete, and the ratio of length, width and height of the vertical flow artificial wetland bed body is 1:05:0.1.

In another embodiment of the present invention, the structure of said second wetland unit is the same as that of the first wetland unit. The first wetland unit comprises a draining layer, a lower layer, a lower transition layer, a middle transition layer, an upper transition layer and an upper layer, in which the draining layer is arranged at the bottom of said vertical flow artificial wetland bed body, the lower layer is arranged at the upper of the draining layer, the lower transition layer is arranged at the upper of the lower layer, the middle transition layer is arranged at the upper of the lower transition layer, the upper transition layer is arranged at the upper of the middle transition layer, the upper layer is arranged at the upper of the upper transition layer. Said upper water conduit along with said upper water conduit branch pipe is arranged between the upper transition layer and the middle transition layer. Said lower water conduit along with said lower water conduit branch pipe is arranged in the draining layer.

In another embodiment of the present invention, the sum of thickness of said draining layer, said lower layer, said middle transition layer, said upper transition layer and said upper layer is less than the height of said vertical flow artificial wetland bed body.

In one more specific embodiment of the present invention, said draining layer is consisted of gravels with 20-30 mm diameter which are lying at the bottom of said vertical flow artificial wetland bed body; said lower layer is consisted of gravels with 15-20 mm diameter which are lying at the upper of the draining layer; said lower transition layer is consisted of gravels with 12-15 mm diameter which are lying at the upper of the lower layer; said middle transition layer is consisted of zeolites with 8-12 mm diameter which are lying at the upper of the lower transition layer; said upper transition layer is consisted of zeolites with 5-8 mm diameter which are lying at the upper of the middle transition layer; and said upper layer is consisted of zeolites with 3-5 mm diameter which are lying at the upper of the upper transition layer.

In another more specific embodiment of the present invention, the upper layer is planted with emerged plants such as reed or calamus.

In the further embodiment of the present invention, an upper water conduit branch pipe outlet is arranged with interval state in the length direction of said upper water conduit branch pipe and with the open of the upper water conduit branch pipe outlet facing down; an lower water conduit branch pipe outlet is arranged with interval state in the length direction of said lower water conduit branch pipe and with the open of the lower water conduit branch pipe outlet facing down.

Another task of the present invention is accomplished. The method of the device for artificial wetland sewage treatment comprises the steps as below:

a. water treatment with forward flushing. Under the condition of leading sewage to be treated into the diversion canal, open the upper water conduit inlet valve, the upper water conduit outlet valve and the lower water conduit control valve, close the upper water conduit control valve, the lower water conduit inlet valve and the lower water conduit outlet valve at the same time. Sewage in the diversion canal flows through the upper water conduit inlet valve into the upper water conduit located in the first wetland unit, and through the upper water conduit branch pipe outlet arranged on the upper water conduit branch pipe to the upper of the first wetland unit. Sewage in the upper of the first wetland unit flows down to the lower of the first wetland unit with a natural vertical downward flow, then through the lower water conduit control valve into the lower water conduit located in the second wetland unit, and through the lower water conduit branch pipe outlet arranged on the lower water conduit branch pipe to the lower of the second wetland unit. Water flowed into the lower of the second wetland unit and treated in the first wetland unit flows up to the upper of the second wetland unit with a vertical upward flow, through the upper water conduit branch pipe outlet arranged on the upper water conduit branch pipe located in the second wetland unit into the upper water conduit, and through the upper water conduit outlet valve to the draining ditch.

b. water treatment with backward flushing. Under the condition of leading sewage to be treated into the diversion canal, open the upper water conduit inlet valve, the lower water conduit outlet valve and the lower water conduit control valve, close the upper water conduit control valve, the upper water conduit inlet valve and the lower water conduit outlet valve at the same time. Sewage in the diversion canal flows through the lower water conduit inlet valve into the lower water conduit located in the first wetland unit, and through the lower water conduit branch pipe to the lower of the first wetland unit. Sewage in the lower of the first wetland unit flows up to the upper of the first wetland unit with a vertical upward flow, then through the upper water conduit control valve into the upper water conduit located in the second wetland unit, and through the upper water conduit branch pipe to the upper of the second wetland unit. Water flowed into the upper of the second wetland unit and treated in the first wetland unit flows down to the lower of the second wetland unit with a natural vertical downward flow, then through the lower water conduit branch pipe located in the second wetland unit into the lower water conduit, and through the lower water conduit outlet valve to the draining ditch. Wherein, said water treatment with forward flushing alternates with said water treatment with backward flushing.

In a further embodiment of the present invention, the alternating time of said alternation is determined by the discharge of sewage into said diversion canal in the unit time and the discharge of treated water out of said draining ditch in the unit time, or determined by the pressure difference between the pressure flow meter arranged on the upper water conduit and the pressure flow meter arranged on the lower water conduit.

The technical effects according to the technical solution in the present invention are: 1) ecological treatment can be performed on the domestic sewage and industrial sewage with low concentration that is polluted slightly, because the first and the second wetland units arranged on the vertical flow artificial wetland bed body form the vertical flow sewage treatment artificial wetland; 2) because the upper water conduit inlet and outlet valves and the upper water conduit control valve are arranged on the pipe of the upper water conduit, and the lower water conduit inlet and outlet valves and the lower water conduit control valve are arranged on the pipe of the lower water conduit, the requirement of the periodic change on the flow regime can be met according to the control of the corresponding valve, which helps to reduce the pollutant, ensure the service life of the vertical flow sewage treatment artificial wetland and avoid pipe blockage; 3) the vertical flow sewage treatment artificial wetland has the regeneration function, which helps to improve the lasting purification treatment capacity on the sewage; 4) because of the simple overall structure and the integrated modular construction, it can achieve the low cost of construction and convenient operation management; 5) the provided method can fully ensure the periodic change of flow regime, and reflect the long-term stable use effect of the whole system.

DESCRIPTION OF EMBODIMENTS

In order to make examiners of patent office especially the public more clearly about the technological essence and beneficial effects of present invention, applicant will describe in detail with reference to the embodiments below. Embodiments described here are not the limitation to the solution of present invention, any equivalent of form rather than substance according to the idea of present invention is within the scope of the solutions of present invention.

Embodiment 1

Figure 1:
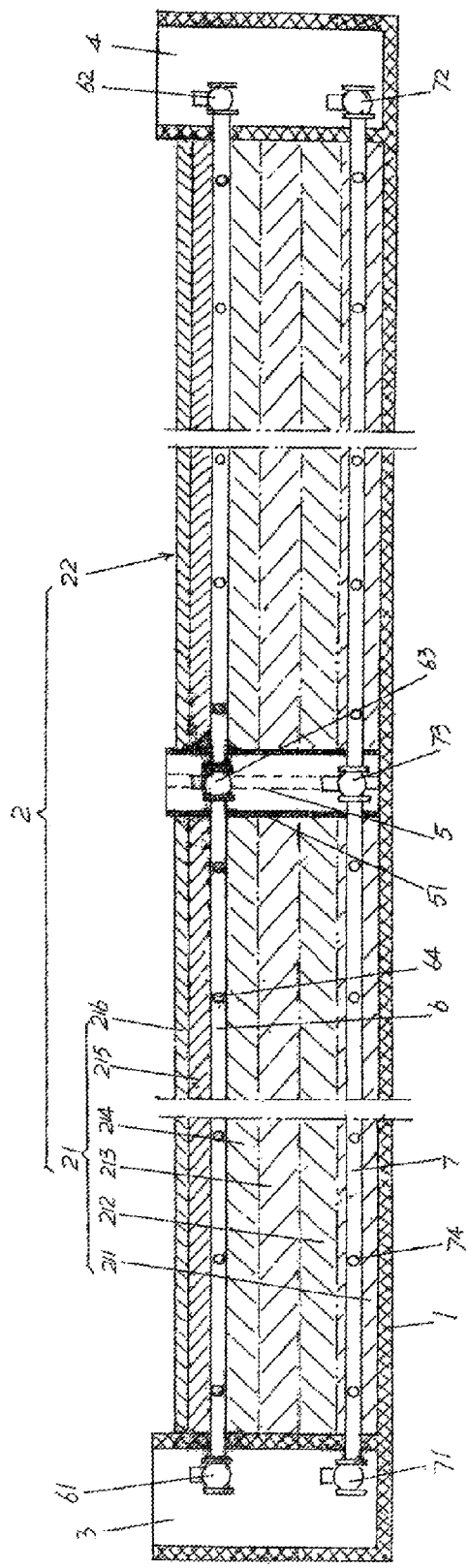
FIG. 1 is a schematic view according to the device for artificial wetland sewage treatment of the present invention.
Figure 2:
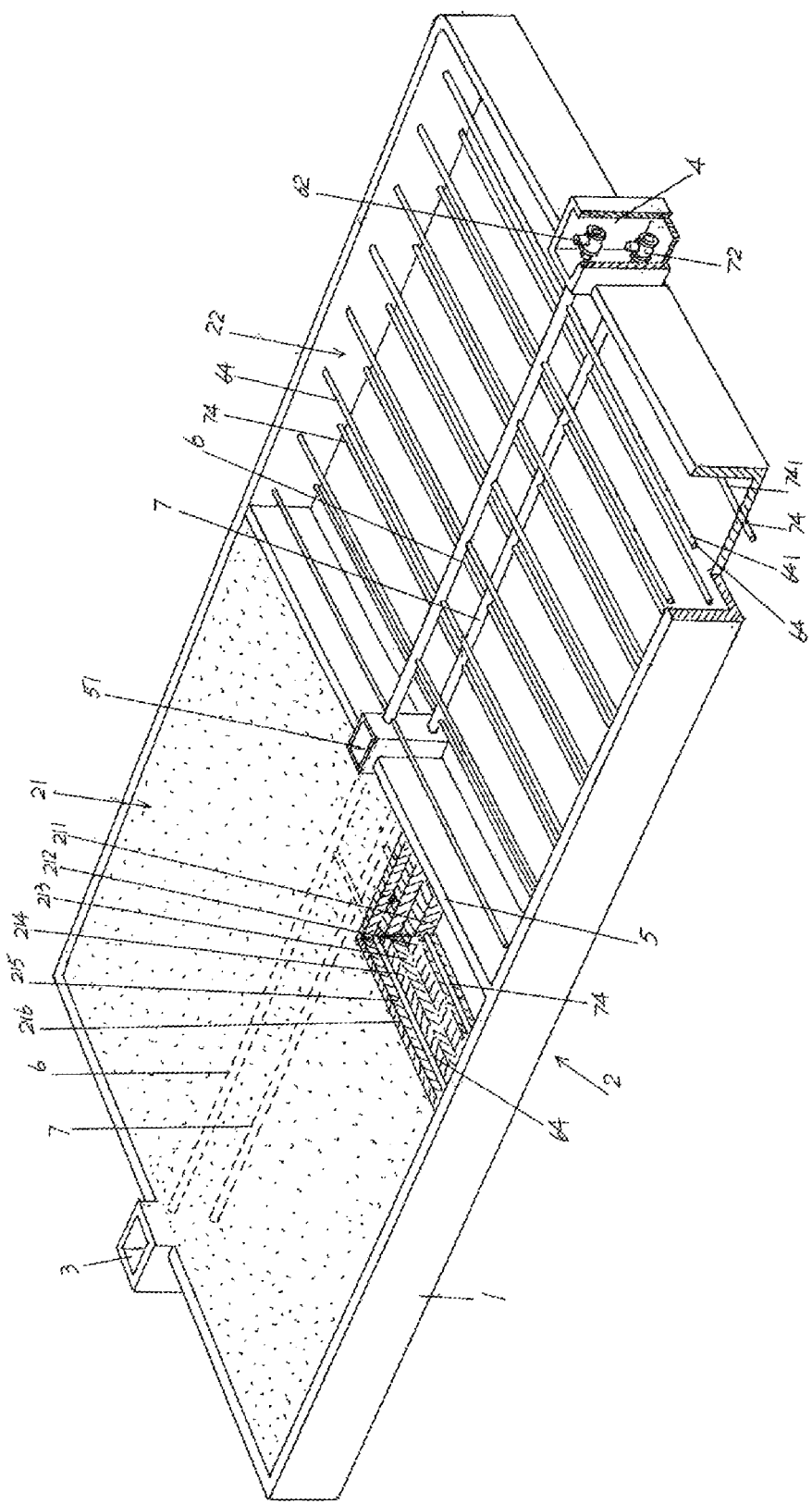
FIG. 2 is the space diagram of FIG. 1.

Referring to FIG. 1 and FIG. 2, the vertical flow artificial wetland bed body 1 is composed of reinforced concrete, preferably poured with reinforced concrete, in which the length, the width and the height of the vertical flow artificial wetland bed body 1 have no special limit in the embodiment, because the volume of the vertical flow artificial wetland bed body 1 can be adaptive adjusted to enlarge or reduce according to the treatment amount of the sewage or processing capacity. But, regardless of the size of the vertical flow artificial wetland bed body 1, it's appropriate to make the ratio of length, width and height is 1:05:0.1, for example, the length is 15 m, then the width is 7.5 m and the height is 1.5 m.

As shown in FIG. 1 and FIG. 2, the vertical flow artificial wetland bed body 1 mentioned above has an openmouthed upper portion and a closed bottom and around, which forms a pool or groove in its overall shape.

The vertical flow sewage treatment artificial wetland 2 is arranged on the upper of the vertical flow artificial wetland bed body 1, i.e. inside the vertical flow artificial wetland bed body 1. A diversion canal 3 is formed directly at one end of the vertical flow artificial wetland bed body 1 (the left ends in the position shown in FIG. 1 and FIG. 2) and in the center position in the width direction of the end, which leads sewage to be treated into the vertical flow sewage treatment artificial wetland 2. A draining ditch 4 is formed directly at the other end of the vertical flow artificial wetland bed body 1 (the right ends in the position shown in FIG. 1 and FIG. 2) and in the center position in the width direction of the end, which leads out water treated in the vertical flow sewage treatment artificial wetland 2. A baffle wall 5 is formed in the center position in the length direction of the vertical flow artificial wetland bed body 1, and divides the vertical flow sewage treatment artificial wetland 2 mentioned above into a first wetland unit 21 located at the left of the baffle wall 5 and a second wetland unit 22 located at the right of the baffle wall 5. A box culvert 51 is formed in the center position in the length direction of the baffle wall 5 and corresponds to the area between the diversion canal 3 and the draining ditch 4, that is to say the diversion canal 3, the box culvert 51 and the draining ditch 4 are on the same line. An upper water conduit 6 preferably a PVC tube is arranged in the vertical flow sewage treatment artificial wetland 2 with a horizontal state and at the upper part of the vertical flow sewage treatment artificial wetland 2, one end of the upper water conduit 6 (left end) extends into the diversion canal 3 and an upper water conduit inlet valve 61 is arranged, the other end (right end) extends into the draining ditch 4 and an upper water conduit outlet valve 62 is arranged, and the center section of the upper water conduit 6 passes through the box culvert 51 and an upper water conduit control valve 63 is arranged at the position corresponding to the box culvert 51. An upper water conduit branch pipe 64 preferably a PVC tube is arranged with interval state in the length direction of the upper water conduit 6, which forms a cross-shape relationship with the upper water conduit 6 in a horizontal plane. A lower water conduit 7 preferably a PVC tube is arranged in the vertical flow sewage treatment artificial wetland 2 with a horizontal state and at the lower part of the vertical flow sewage treatment artificial wetland 2, one end of the lower water conduit 7 (left end) extends into the diversion canal 3 and a lower water conduit inlet valve 71 is arranged, the other end (right end) extends into the draining ditch 4 and a lower water conduit outlet valve 72 is arranged, and the center section of the lower water conduit 7 passes through the box culvert 51 and a lower water conduit control valve 73 is arranged at the position corresponding to the box culvert 51. A lower water conduit branch pipe 74 preferably a PVC tube is arranged with interval state in the length direction of the lower water conduit 7, which forms a cross-shape relationship with the lower water conduit 7.

Sewage mentioned above includes but not limited as below: one is urban domestic sewage, the second is industrial sewage with low concentration that is polluted slightly. The industrial sewage with low concentration is the industrial sewage with COD<350 mg/L, $NH_3$—N<30 mg/L, SS<200 mg/L, TN<35 mg/L and/or TP<5 mg/L.

Because the structure and the function of the second wetland unit 22 mentioned above is the same as those of the first wetland unit 21, which is just divided by the baffle wall 5, applicant will only describe the first wetland unit 21 in detail.

Referring to FIG. 1 and FIG. 2, the first wetland unit 21 mentioned above comprises a draining layer 211, a lower layer 212, a lower transition layer 213, a middle transition layer 214, an upper transition layer 215 and an upper layer 216, in which the draining layer 211 is arranged at the bottom of said vertical flow artificial wetland bed body 1, the lower layer 212 is arranged at the upper of the draining layer 211, the lower transition layer 213 is arranged at the upper of the lower layer 212, the middle transition layer 214 is arranged at the upper of the lower transition layer 213, the upper transition layer 215 is arranged at the upper of the middle transition layer 214, the upper layer 216 is arranged at the upper of the upper transition layer 215. Said upper water conduit 6 along with said upper water conduit branch pipe 64 is arranged between the upper transition layer 215 and the middle transition layer 214. Said lower water conduit 7 along with said lower water conduit branch pipe 74 is arranged in the draining layer 211.

Preferably, the sum of the thickness of the draining layer 211, the lower layer 212, the lower transition layer 213, the middle transition layer 214, the upper transition layer 215 and the upper layer 216 is less than the height of the vertical flow artificial wetland bed body 1.

The draining layer 211 mentioned above is consisted of gravels with 20-30 mm diameter which are lying at the bottom of said vertical flow artificial wetland bed body 1; the lower layer 212 mentioned above is consisted of gravels with 15-20 mm diameter which are lying at the upper of the draining layer 211; said lower transition layer 213 is consisted of gravels with 12-15 mm diameter which are lying at the upper of the lower layer 212; said middle transition layer 214 is consisted of zeolites with 8-12 mm diameter which are lying at the upper of the lower transition layer 213; said upper transition layer 215 is consisted of zeolites with 5-8 mm diameter which are lying at the upper of the middle transition layer 214; and said upper layer 216 is consisted of zeolites with 3-5 mm diameter which are lying at the upper of the upper transition layer 215.

Preferably, the upper layer 216 is planted with emerged plants such as reed or calamus (not shown).

In this embodiment, the length of the vertical flow artificial wetland bed body 1 is 15 m, the width is 7.5 m and the height is 1.5 m, and the thickness of the draining layer 211 is 20 cm, the thickness of the lower layer 212 is 20 cm, the thickness of the lower transition layer 213 is 30 cm, the thickness of the middle transition layer 214 is 40 cm, the thickness of the upper transition layer 215 is 20 cm and the thickness of the upper layer 216 is 10 cm. In addition, according to the common knowledge, the length and the width of the draining layer 211, the lower layer 212, the lower transition layer 213, the middle transition layer 214, the upper transition layer 215 and the upper layer 216 are corresponding to the length and the width of the vertical flow artificial wetland bed body 1.

Figure 3:
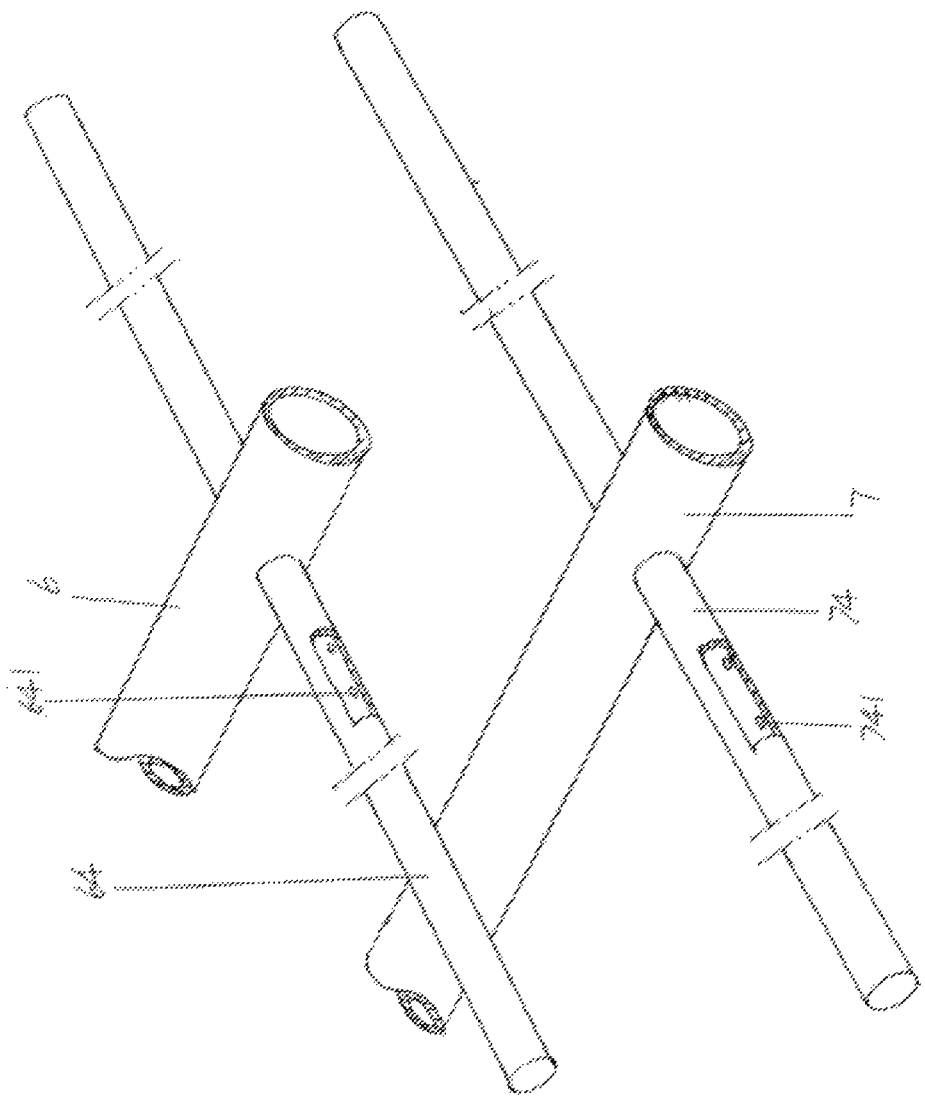
FIG. 3 is the detailed structure view of the upper water conduit and the lower water conduit shown in FIG. 1 and FIG. 2.

Referring to FIG. 3 as well as FIG. 1 and FIG. 2, an upper water conduit branch pipe outlet 641 is arranged with interval state in the length direction of said upper water conduit branch pipe 64 and with the open of the upper water conduit branch pipe outlet 641 facing down; an lower water conduit branch pipe outlet 741 is arranged with interval state in the length direction of said lower water conduit branch pipe 74 and with the open of the lower water conduit branch pipe outlet 741 facing down.

Embodiment 2

It is the same as that described in embodiment 1, except that the thickness of the draining layer 211 is 25 cm, the thickness of the lower layer 212 is 25 cm, the thickness of the lower transition layer 213 is 30 cm, the thickness of the middle transition layer 214 is 35 cm, the thickness of the upper transition layer 215 is 25 cm and the thickness of the upper layer 216 is 10 cm.

In use:

The method for treating sewage with artificial wetland sewage treatment device provided by present invention is accomplished as below:

a. water treatment with forward flushing. Under the condition of leading sewage to be treated into the diversion canal 3, open the upper water conduit inlet valve 61, the upper water conduit outlet valve 62 and the lower water conduit control valve 73, close the upper water conduit control valve 63, the lower water conduit inlet valve 71 and the lower water conduit outlet valve 72 at the same time. Sewage in the diversion canal 3 flows through the upper water conduit inlet valve 61 into the upper water conduit 6 located in the first wetland unit 21, and through the upper water conduit branch pipe outlet 641 arranged on the upper water conduit branch pipe 64 to the upper of the first wetland unit 21. Sewage in the upper of the first wetland unit 21 flows down to the lower of the first wetland unit 21 with a natural vertical downward flow, then through the lower water conduit control valve 73 into the lower water conduit 7 located in the second wetland unit 22, and through the lower water conduit branch pipe outlet 741 arranged on the lower water conduit branch pipe 74 to the lower of the second wetland unit 22. Water flowed into the lower of the second wetland unit 22 and treated in the first wetland unit 21 flows up to the upper of the second wetland unit 22 with a vertical upward flow, through the upper water conduit branch pipe outlet 641 arranged on the upper water conduit branch pipe 64 located in the second wetland unit 22 into the upper water conduit 6, and through the upper water conduit outlet valve 62 to the draining ditch 4.

b. water treatment with backward flushing. Under the condition of leading sewage to be treated into the diversion canal 3, open the upper water conduit inlet valve 63, the lower water conduit outlet valve 71 and the lower water conduit control valve 72, close the upper water conduit control valve 61, the upper water conduit inlet valve 62 and the lower water conduit outlet valve 73 at the same time. Sewage in the diversion canal 3 flows through the lower water conduit inlet valve 71 into the lower water conduit 7 located in the first wetland unit 21, and through the lower water conduit branch pipe outlet 741 arranged on the lower water conduit branch pipe 74 to the lower of the first wetland unit 21. Sewage in the lower of the first wetland unit 21 flows up to the upper of the first wetland unit 21 with a vertical upward flow, then through the upper water conduit control valve 63 into the upper water conduit 6 located in the second wetland unit 22, and through the upper water conduit branch pipe outlet 641 arranged on the upper water conduit branch pipe 64 to the upper of the second wetland unit 22. Water flowed into the upper of the second wetland unit 22 and treated in the first wetland unit 21 flows down to the lower of the second wetland unit 22 with a natural vertical downward flow, then through the lower water conduit branch pipe outlet 741 arranged on the lower water conduit branch pipe 74 located in the second wetland unit 22 into the lower water conduit 7, and through the lower water conduit outlet valve 72 to the draining ditch 4. Wherein, said water treatment with forward flushing alternates with said water treatment with backward flushing. The alternating time of the alternation is determined by the discharge of sewage into said diversion canal 3 in the unit time and the discharge of treated water out of said draining ditch 4 in the unit time, or determined by the pressure difference between the pressure flow meter arranged on the upper water conduit 6 and the pressure flow meter arranged on the lower water conduit 7.

What is claimed is:

1. A device for artificial wetland sewage treatment, characterized in that the device comprises a vertical flow artificial wetland bed body (1) with an openmouthed upper portion and a closed bottom and around, a vertical flow sewage treatment artificial wetland (2) arranged on the vertical flow artificial wetland bed body (1); a diversion canal (3) formed at one end of the vertical flow artificial wetland bed body (1) and in the center position in the width direction of the end, which leads sewage to be treated into the vertical flow sewage treatment artificial wetland (2); a draining ditch (4) formed at the other end of the vertical flow artificial wetland bed body (1) and in the center position in the width direction of the end, which leads out water treated in the vertical flow sewage treatment artificial wetland (2); a baffle wall (5) formed in the center position in the length direction of vertical flow artificial wetland bed body (1) and dividing said vertical flow sewage treatment artificial wetland (2) into a first wetland unit (21) and a second wetland unit (22), a box culvert (51) formed in the center position in the length direction of the baffle wall (5) and corresponding to the area between said diversion canal (3) and said draining ditch (4); an upper water conduit (6) arranged in the vertical flow sewage treatment artificial wetland (2) with a horizontal state and at the upper part of the vertical flow sewage treatment artificial wetland (2), one end of upper water conduit (6) extends into said diversion canal (3) and an upper water conduit inlet valve (61) is arranged, the other end extends into said draining ditch (4) and an upper water conduit outlet valve (62) is arranged, the center section of the upper water conduit (6) passes through said box culvert (51) and an upper water conduit water control valve (63) is arranged at the position corresponding to the box culvert (51); an upper water conduit branch pipe (64) is arranged with interval state in the length direction of the upper water conduit (6), which forms a cross-shape relationship with upper water conduit (6); a lower water conduit (7) arranged in the vertical flow sewage treatment artificial wetland (2) with a horizontal state and at the lower part of the vertical flow sewage treatment artificial wetland (2), one end of lower water conduit (7) extends into said diversion canal (3) and an lower water conduit inlet valve (71) is arranged, the other end extends into said draining ditch (4) and an lower water conduit outlet valve (72) is arranged, the center section of the lower water conduit (7) pass through said box culvert (51) and an lower water conduit water control valve (73) is arranged at the position corresponding to the box culvert (51); an lower water conduit branch pipe (74) is arranged with interval state in the length direction of the lower water conduit (7), which forms a cross-shape relationship with lower water conduit (7).

2. The device for artificial wetland sewage treatment according to claim 1, characterized in that said sewage is urban domestic sewage or industrial sewage with low concentration, said low concentration of industrial sewage is the sewage with COD<350 mg/L, $NH_3$—N<30 mg/L, SS<200 mg/L, TN<35 mg/L and/or TP<5 mg/L.

3. The device for artificial wetland sewage treatment according to claim 1, characterized in that said vertical flow artificial wetland bed body (1) is made of reinforced concrete, and the ratio of length, width and height of the vertical flow artificial wetland bed body (1) is 1:05:0.1.

4. The device for artificial wetland sewage treatment according to claim 1, characterized in that the structure of said second wetland unit (22) is the same as that of the first wetland unit (21), the first wetland unit (21) comprises a draining layer (211), a lower layer (212), a lower transition layer (213), a middle transition layer (214), an upper transition layer (215) and an upper layer (216), in which the draining layer (211) is arranged at the bottom of said vertical flow artificial wetland bed body (1), the lower layer (212) is arranged at the upper of the draining layer (211), the lower transition layer (213) is arranged at the upper of the lower layer (212), the middle transition layer (214) is arranged at the upper of the lower transition layer (213), the upper transition layer (215) is arranged at the upper of the middle transition layer (214), the upper layer (216) is arranged at the upper of the upper transition layer (215), and said upper water conduit (6) along with said upper water conduit branch pipe (64) is arranged between the upper transition layer (215) and the middle transition layer (214), and said lower water conduit (7) along with said lower water conduit branch pipe (74) is arranged in the draining layer (211).

5. The device for artificial wetland sewage treatment according to claim 4, characterized in that the sum of the thickness of the draining layer (211), the lower layer (212), the lower transition layer (213), the middle transition layer (214), the upper transition layer (215) and the upper layer (216) is less than the height of the vertical flow artificial wetland bed body (1).

6. The device for artificial wetland sewage treatment according to claim 5, characterized in that said draining layer (211) is consisted of gravels with 20-30 mm diameter which are lying at the bottom of said vertical flow artificial wetland bed body (1); said lower layer (212) is consisted of gravels with 15-20 mm diameter which are lying at the upper of the draining layer (211); said lower transition layer (213) is consisted of gravels with 12-15 mm diameter which are lying at the upper of the lower layer (212); said middle transition layer (214) is consisted of zeolites with 8-12 mm diameter which are lying at the upper of the lower transition layer (213); said upper transition layer (215) is consisted of zeolites with 5-8 mm diameter which are lying at the upper of the middle transition layer (214); and said upper layer (216) is consisted of zeolites with 3-5 mm diameter which are lying at the upper of the upper transition layer (215).

7. The device for artificial wetland sewage treatment according to claim 4, characterized in that said draining layer (211) is consisted of gravels with 20-30 mm diameter which are lying at the bottom of said vertical flow artificial wetland bed body (1); said lower layer (212) is consisted of gravels with 15-20 mm diameter which are lying at the upper of the draining layer (211); said lower transition layer (213) is consisted of gravels with 12-15 mm diameter which are lying at the upper of the lower layer (212); said middle transition layer (214) is consisted of zeolites with 8-12 mm diameter which are lying at the upper of the lower transition layer (213); said upper transition layer (215) is consisted of zeolites with 5-8 mm diameter which are lying at the upper of the middle transition layer (214); and said upper layer (216) is consisted of zeolites with 3-5 mm diameter which are lying at the upper of the upper transition layer (215).

8. The device for artificial wetland sewage treatment according to claim 7, characterized in that said upper layer (216) is planted with emerged plants such as reed or calamus.

9. The device for artificial wetland sewage treatment according to claim 4, characterized in that an upper water conduit branch pipe outlet (641) is arranged with interval state in the length direction of said upper water conduit branch pipe (64) and with the open of the upper water conduit branch pipe outlet (641) facing down; an lower water conduit branch pipe outlet (741) is arranged with interval state in the length direction of said lower water conduit branch pipe (74) and with the open of the lower water conduit branch pipe outlet (741) facing down.

10. The device for artificial wetland sewage treatment according to claim 1, characterized in that an upper water conduit branch pipe outlet (641) is arranged with interval state in the length direction of said upper water conduit branch pipe (64) and with the open of the upper water conduit branch pipe outlet (641) facing down; an lower water conduit branch pipe outlet (741) is arranged with interval state in the length direction of said lower water conduit branch pipe (74) and with the open of the lower water conduit branch pipe outlet (741) facing down.

11. A method for treating sewage with the artificial wetland sewage treatment device according to claim 1, comprising the following steps:
    a. water treatment with forward flushing: under the condition of leading sewage to be treated into the diversion canal (3), opening the upper water conduit inlet valve (61), the upper water conduit outlet valve (62) and the lower water conduit control valve (73), closing the upper water conduit control valve (63), the lower water conduit inlet valve (71) and the lower water conduit outlet valve (72) at the same time, making sewage in the diversion canal (3) flow through the upper water conduit inlet valve (61) into the upper water conduit (6) located in the first wetland unit (21), and through the upper water conduit branch pipe outlet (641) arranged on the upper water conduit branch pipe (64) to the upper of the first wetland unit (21); making sewage in the upper of the first wetland unit (21) flow down to the lower of the first wetland unit (21) with a natural vertical downward flow, then through the lower water conduit control valve (73) into the lower water conduit (7) located in the second wetland unit (22), and through the lower water conduit branch pipe outlet (741) arranged on the lower water conduit branch pipe (74) to the lower of the second wetland unit (22); making water flowed into the lower of the second wetland unit (22) and treated in the first wetland unit (21) flow up to the upper of the second wetland unit (22) with a vertical upward flow, through the upper water conduit branch pipe outlet (641) arranged on the upper water conduit branch pipe (64) located in the second wetland unit (22) into the upper water conduit (6), and through the upper water conduit outlet valve (62) to the draining ditch (4);
    b. water treatment with backward flushing: under the condition of leading sewage to be treated into the diversion canal (3), opening the upper water conduit inlet valve (63), the lower water conduit outlet valve (71) and the lower water conduit control valve (72), closing the upper water conduit control valve (61), the upper water conduit inlet valve (62) and the lower water conduit outlet valve (73) at the same time; making sewage in the diversion canal (3) flow through the lower water conduit inlet valve (71) into the lower water conduit (7) located in the first wetland unit (21), and through the lower water conduit branch pipe outlet (741) arranged on the lower water conduit branch pipe (74) to the lower of the first wetland unit (21); making sewage in the lower of the first wetland unit (21) flow up to the upper of the first wetland unit (21) with a vertical upward flow, then through the upper water conduit control valve (63) into the upper water conduit (6) located in the second wetland unit (22), and through the upper water conduit branch pipe outlet (641) arranged on the upper water conduit branch pipe (64) to the upper of the second wetland unit (22); making water flowed into the upper of the second wetland unit (22) and treated in the first wetland unit (21) flow down to the lower of the second wetland unit (22) with a natural vertical downward flow, then through the lower water conduit branch pipe outlet (741) arranged on the lower water conduit branch pipe (74) located in the second wetland unit (22) into the lower water conduit (7), and through the lower water conduit outlet valve (72) to the draining ditch (4); wherein, said water treatment with forward flushing alternates with said water treatment with backward flushing.

12. The method for treating sewage with the artificial wetland sewage treatment device according to claim 11, characterized in that said alternating time of the alternation is determined by the discharge of sewage into said diversion canal (3) in the unit time and the discharge of treated water out of said draining ditch (4) in the unit time, or determined by the pressure difference between the pressure flow meter arranged on the upper water conduit (6) and the pressure flow meter arranged on the lower water conduit (7).

* * * * *